INVENTORS
George W. Onksen &
BY Kenneth R. Skinner

ATTORNEY

United States Patent Office 3,535,680
Patented Oct. 20, 1970

3,535,680
VEHICLE SIGNALING SYSTEMS
George W. Onksen and Kenneth R. Skinner, Anderson, Ind., assignors to General Motors Corporation, Detroit, Mich., a corporation of Delaware
Filed June 14, 1967, Ser. No. 646,017
Int. Cl. B60q *1/38, 1/44*
U.S. Cl. 340—67      7 Claims

ABSTRACT OF THE DISCLOSURE

A vehicle signaling system combining a turn signal lamp energizing circuit, which includes a manually operable turn signal switch, with a tail lamp control circuit. The system also includes a motion switch that is responsive to vehicle movement and a brake switch that is actuated when the vehicle brakes are applied. These circuits and switches operate when a turn is made to flash front and rear mounted turn signal lamps, and when the vehicle is stationary to illuminate rear mounted red tail lamps, or when the vehicle is in motion to illuminate rear mounted green tail lamps.

---

Figure 1:
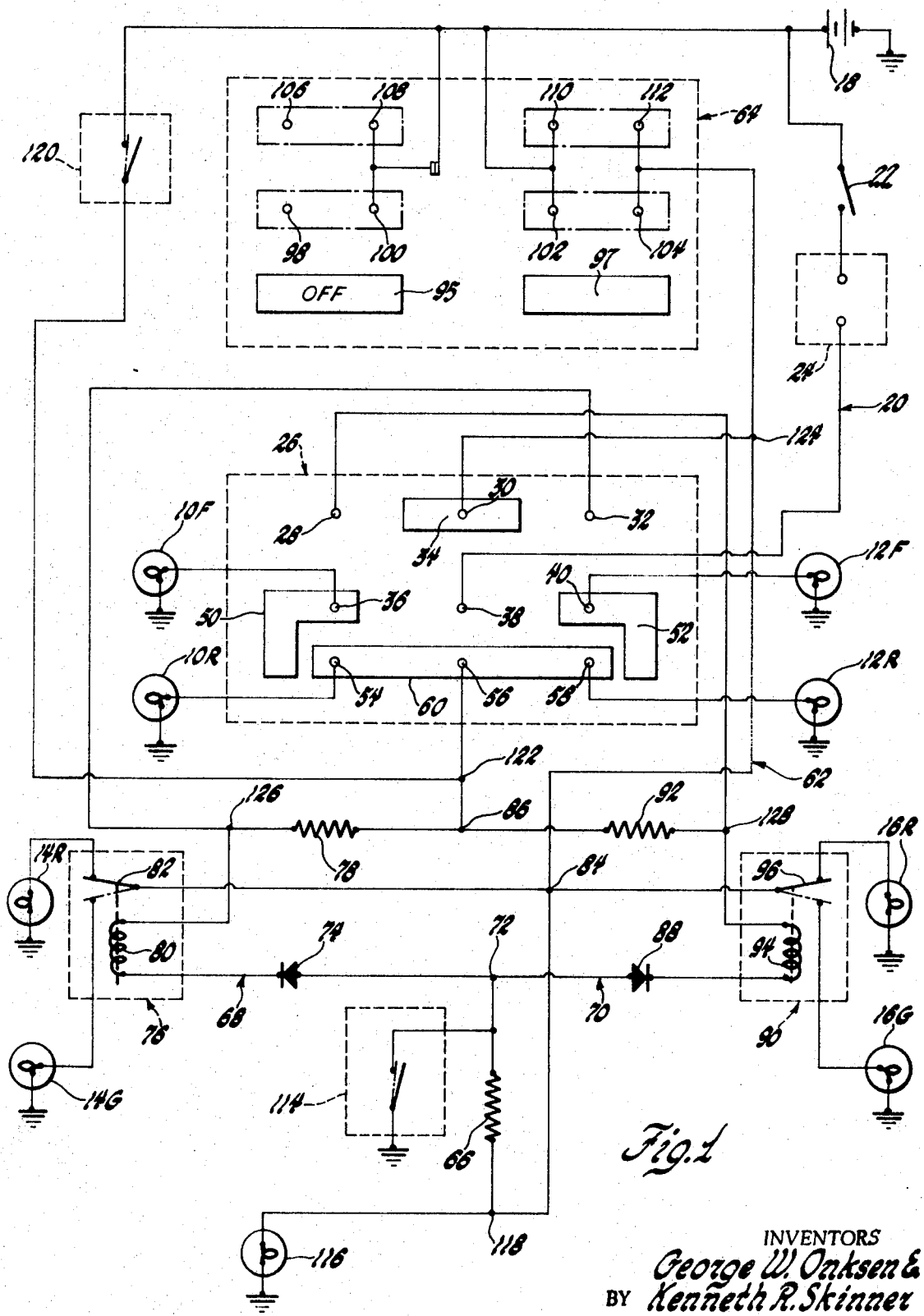

This invention relates generally to vehicle signaling systems and particularly to vehicle signaling systems that reflect whether the vehicle is turning, stopping, moving or stationary.

When it is desired to install other than the usual turn signal and stop lamps on a vehicle; for example, lamps indicating that a vehicle is stationary or moving, there is usually required additional lamps, and this in turn requires additional circuitry. Costs then become a consideration in the design of the vehicle signaling system. If the circuits are all separate, fabrication and installation costs are increased because there is usually duplication. Then too, the individual circuits all require space and, of course, service costs inherently increase. On the other hand, if, by combining these circuits, complexity results, overall costs may be greater.

Accordingly, there is contemplated by the invention a novel and versatile vehicle signaling system that effectively serves several signaling functions with a minimum of uncomplicated, uniquely related electric circuits.

Further contemplated is a new vehicle signaling system wherein the different lamps required are capable of performing more than one signaling function and also may have more than one circuit function.

Somewhat more specifically stated, a novel signaling system is proposed by the invention wherein both turn signaling by turn signal lamps and vehicle movement signaling by tail lamps are achieved through effective utilization of a turn signal energizing circuit and a tail lamp control circuit. These circuits are uncomplicated and permit many variations in the signaling system.

In carrying out the invention according to one form thereof, the vehicle incorporating the signaling system has front and rear mounted turn signal lamps and a pair of colored tail lamps on each side of the rear of the vehicle. One of the pair of tail lamps is red and the other is green. A turn signal energizing circuit including a turn signal switch flashes the turn signal lamps on the side of the vehicle on which the turn is to be made. The red and green tail lamps are operated by a tail lamp control circuit that includes a relay, which is operated either to connect the green tail lamps or the red tail lamps to a current source. When the vehicle is in motion, a motion switch causes the relay to be actuated so that the green tail lamps are illuminated. When the vehicle is stationary, the motion switch then causes the relay to operate so as to illuminate the red tail lamps. Stops can be indicated either by the red tail lamps or by the steady illumination of the rear turn signal lamps, except when a turn is also being indicated, and then only the nonflashing rear turn signal lamp is illuminated. These circuits are combined so that the turn signal lamps provide a ground for the tail lamp control circuit during certain conditions.

Figure 2:
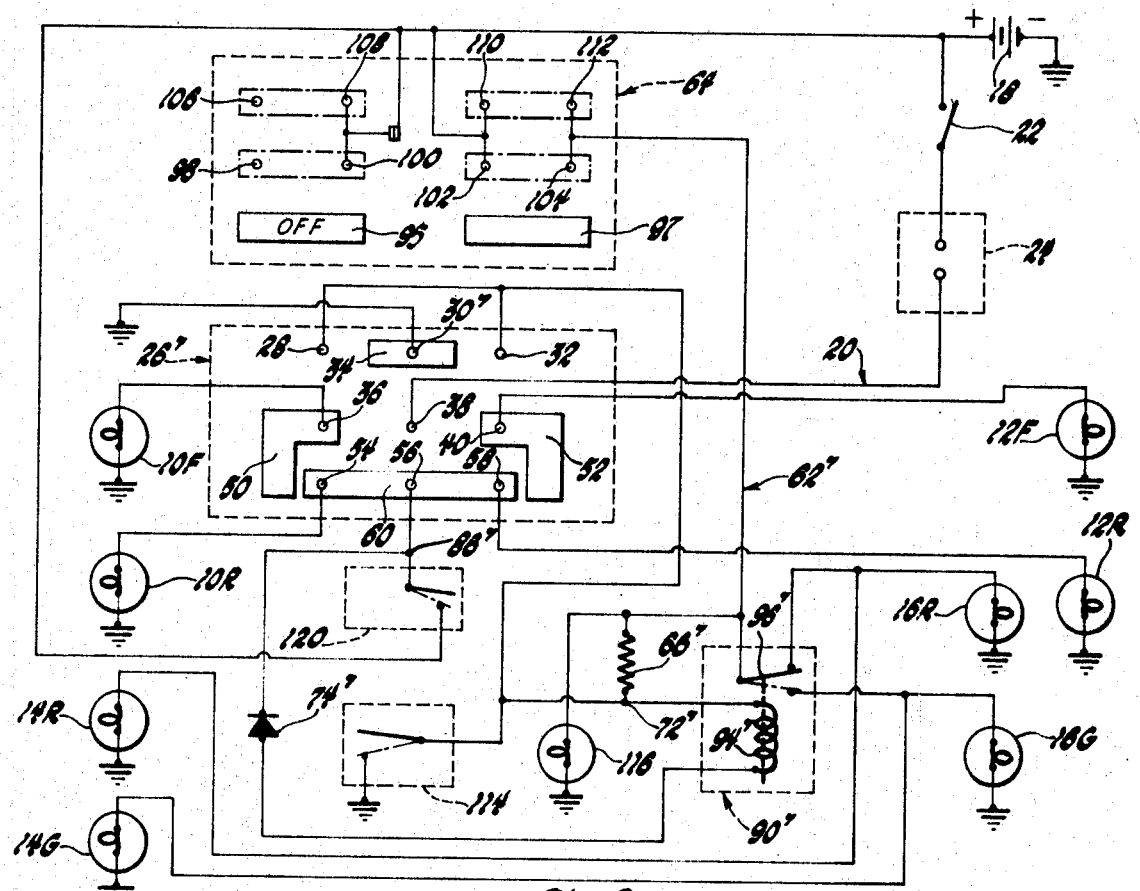
Figure 3:
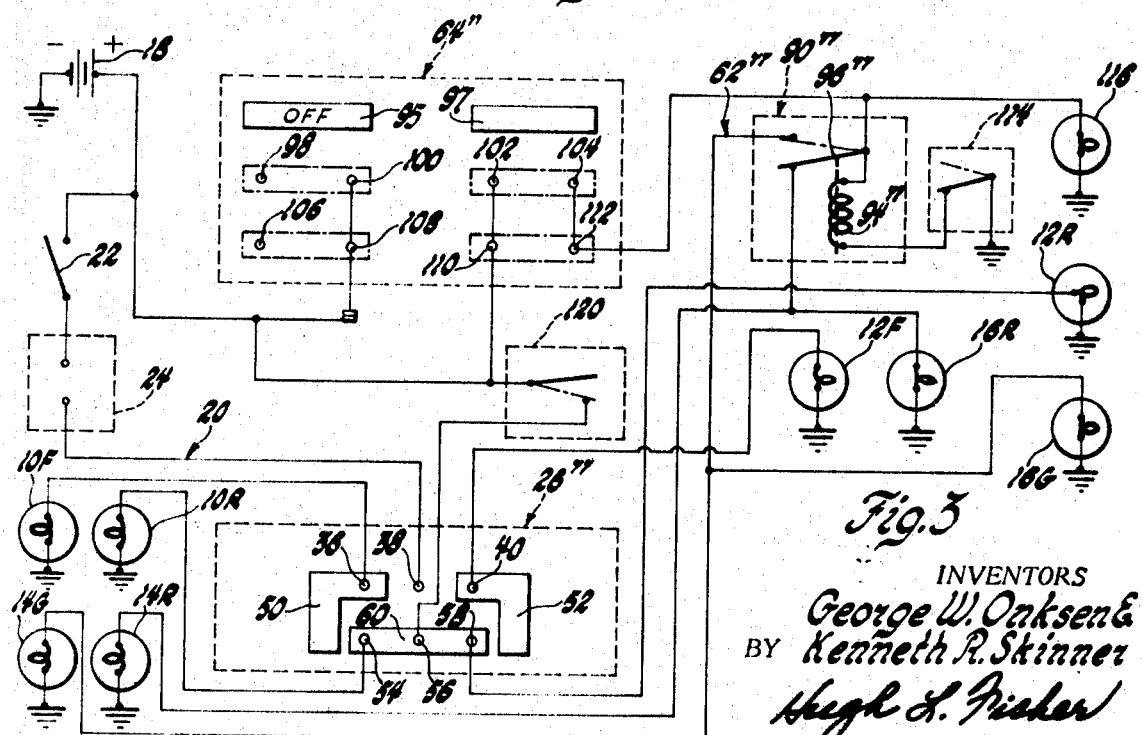

The foregoing and other objects and advantages of the invention will become apparent from the following description and the accompanying drawings, in which:

FIG. 1 is a schematic electrical diagram of a vehicle signaling system incorporating the principles of the invention; and FIGS. 2 and 3 are schematic electrical diagrams of modifications of the FIG. 1 vehicle signaling system.

Referring first to FIG. 1, the vehicle signaling system depicted includes front and rear mounted turn signal lamps 10F and 10R on one side and 12F and 12R on tthe other side. For explanatory purposes, it will be assumed that the turn signal lamps 10F and 10R and 12F and 12R are respectively mounted on the left and right sides of the vehicle. These locations conveniently correspond with the location of the lamps in the FIG. 1 diagram. Also at the rear of the vehicle and on the left side are a pair of tail lamps 14R and 14G, and on the right side a pair of tail lamps 16R and 16G. Preferably, the tail lamps 14R and 16R are red colored and tail lamps 14G and 16G are green colored. Other colors, which may be determined by local regulations, can be used. Hereafter, these tail lamps will be referred to by their colors. It is expected that the lamps themselves may be colored or the lens with which they are usually used.

The energizing source for these lamps is denoted at 18 and may be the conventional twelve-volt vehicle battery used in combination with a voltage regulator and an alternator, not shown. According to conventional practice, the battery 18 will have its negative terminal grounded to the vehicle frame and its positive terminal connected to the various loads including the lamps. Therefore, the frame will provide a return path from the loads and the lamps to the battery 18.

The turn signal lamps 10F and 10R, 12F and 12R are operated by a turn signal energizing circuit, denoted generally at 20. This circuit 20 extends from the battery 18 through an ignition switch 22, a flasher 24, a turn signal switch, designated generally at 26, through the grounded turn signal lamps 10F, 10R, 12F, 12R, and back to the battery 18. The flasher 24 may be of any known type; e.g., of the hot wire or the electronic oscillator type as long as the desired flashing rate is provided.

The turn signal switch 26, as viewed in FIG. 1, includes an upper or first row of fixed contacts 28, 30, 32 that are selectively interconnected by an upper bridging member 34, an intermediate or second row of fixed contacts 36, 38 and 40 that are selectively joined by the upper parts of L-shaped bridging members 50 and 52, and a bottom or third row of fixed contacts 54, 56 and 58 that are selectively interconnected by a lower bridging member 60. The bridging members 34, 50, 52 and 60 are moved together from the illustrated neutral position, either to the left or to the right, by appropriate mechanism well known in the art. Therefore, the mechanism is not described because it is not considered necessary to an understanding of the invention. The turn signal switch 26 will be further explained, including its operation, in the operational summary.

The red and green tail lamps 14R, 16R and 14G, 16G are operated by a tail lamp control circuit designated generally at 62. This circuit 62 extends from the vehicle battery 18 through a lamp switch shown at 64, a current limiting resistor 66 and by parallel left and right tail lamp operating branches 68 and 70 to the turn signal switch 26. At the turn signal switch 26 the circuit 62 proceeds by way of the fixed contact 56 and the bridging member 60 either by way of one or both of the fixed contacts 54 and 58, determined by the position of the turn signal switch 26, to the grounded rear turn signal lamps 10R and 12R and back to the vehicle battery 18.

The left and right tail lamp operating branches 68 and 70 are each the same. The left branch 68 commences at a common junction 72 for the branches 68 and 70 and includes in series a one-way conducting device, such as a diode 74, a relay 76 and a potential or voltage dropping resistor 78. The forward conduction direction for the diode 74 is, as illustrated, from the common junction 72 through the relay 76. The relay 76 further includes a relay winding 80 and an armature 82, which is joined at a junction 84 to the tail lamp control circuit 62. The armature 82 is therefore in parallel with the branch 68 and receives current from the battery 18 by way of the lamp switch 64, substantially at battery potential for energizing the tail lamps 14R or 14G. Thus, in the illustrated solid line or relay deenergized position, the armature 82 connects the red tail lamp 14R to the battery 18, and in the relay energized or the depicted broken line position, the armature 82 connects the green tail lamp 14G to the battery 18. Of course, when these tail lamps 14R and 14G are connected to the battery 18, they will be illuminated. The voltage dropping resistor 78 serves a function to be explained and has its low potential side connected to another common junction at 86 for the two branches 68 and 70.

The right tail lamp operating branch 70 being, as mentioned, similar to the left branch 68, includes a one-way conducting device, such as a diode 88 in series with and poled to conduct in the forward direction through a right tail lamp relay 90 and a voltage dropping resistor 92 to the common junction 86. The right tail lamp relay 90 also has a relay winding 94 and an armature 96 that is connected to the common junction 84, and in the deenergized solid line position will connect the red tail lamp 16R to the battery 18, and in the energized broken line position will connect the green tail lamp 16G to the battery 18, so that these red and green tail lamps 16R and 16G are respectively illuminated.

Describing now the lamp switch 64, the switch 64 has two bridging members 95 and 97 that are removable together by any suitable manually operable mechanism (not shown) from the off position shown in solid lines to the illustrated broken line intermediate and upper positions.

In the intermediate position the bridging member 95 interconnects fixed contacts 98 and 100. The fixed contact 100 is connected to the battery 18 and the fixed contact 98 to, e.g., the vehicle parking lamps, not shown. Hence, the parking lamps will be illuminated. Also in this intermediate position, the bridging member 97 interconnects fixed contacts 102 and 104. Since the fixed contact 102 is connected to the battery 18 and the fixed contact 104 to the left and right tail lamp operating branches 68 and 70, the tail lamp control circuit 62 is completed.

In the upper position of the lamp switch 64, the bridging member 95 interconnects a fixed contact 106 to, e.g., the headlamps, not shown, and a fixed contact 108 to the battery 18. This position illuminates the headlamps. The bridging member 97 interconnects fixed contacts 110 and 112, which are respectively cross-connected to fixed contacts 102 and 104, so that in this upper position as in the intermediate position the tail lamp control circuit 62 is completed.

For responding to the motion of the vehicle, a motion switch displayed generally at 114 is employed. The mode of operation of the motion switch 114 can be varied in well known ways and according to accepted practices. For example, the motion switch 114 can be actuated by the speedometer, a governor or any other device that reflects actual movement of the vehicle, or the motion switch 114 could be related to accelerator pedal movement provided it also was related to a transmission forward drive setting so that forward vehicle motion did, in fact, result from a depression of the accelerator pedal. These choices will, of course, depend upon the application of the system. A specific example of a motion switch that could be utilized is disclosed in United States application S.N. 646,058 of Kenneth R. Skinner for Vehicle Signaling Systems filed June 14, 1967 of common ownership with this application.

In the FIG. 1 schematic, the motion switch 114 is in the broken line closed position when the vehicle is stationary, and in the solid line open position when the vehicle is moving. It will be noted that when closed, the motion switch 114 grounds the common junction 72 between the left and right tail lamp operating branches 68 and 70. Since the other common junction 86 is connected to ground through the turn signal switch 26, the left and right relays 76 and 90 have their opposite sides at the same potential and will be deenergized. The red tail lamps 14R and 16R are consequently illuminated.

The function of the resistor 66 will now become apparent since it is desirable to connect a license lamp 116 to a junction 118 in the tail lamp control circuit 62 so as to be connected to the battery 18 through the light switch 64. With the motion switch 114 closed and no resistance to limit current, the license lamp 116 would be, in effect, shorted to ground through the motion switch 114. The resistor 66 limits the amount of current that can flow to ground through the motion switch 114 so that there is adequate current to energize and illuminate the license lamp 116 as well as to operate the tail lamp control 62.

To provide warning about a brake application, a brake switch at 120 is included and provides a parallel current path directly from the battery 18 to a junction 122 between the turn signal switch 26 and the left and right tail lamp operating parallel branches 68 and 70. Conventional, well-known mechanism can be used to operate the brake switch 120, therefore, it has not been illustrated. This mechanism, upon a brake application, will move the brake switch 120 from its illustrated solid line open position to its illustrated broken line closed position and connect the battery 18 to the junction 122. Consequently, current will flow therethrough, then by way of the junction 122, and the turn signal switch bridging member 60, to the rear turn signal lamps 10R and 12R. These rear turn signal lamps 10R and 12R are, therefore, both illuminated, provided the turn signal switch 26 is in the neutral position. If the turn signal switch 26 is in either of the other positions; i.e., the left turn or right turn position, the nonflashing rear turn signal lamp 10R or 12R will be illuminated. At the same time it will be noted, assuming that the vehicle is moving and the motion switch 114 is open, that battery potential is applied to both the common junction 86 and the common junction 72 between the parallel branches 68 and 70. Consequently, the left and right relays 76 and 90 will be deenergized and the red tail lamps 14R and 16R will also be illuminated.

Summarizing the operation of the FIG. 1 vehicle signaling system, the basic conditions will be discussed; namely, when the vehicle is stationary and when the vehicle is in motion. Because the system is intended for night time driving, the light switch 64 will be in either the intermediate position or the upper position. If the system is to be used both in the daytime and the night time, another position could be included similar to that of the intermediate position for the bridging member 97 so as to complete the tail lamp control circuit 62 whether or not the parking lamps or the headlamps are illuminated.

Assuming first that the vehicle is stationary, the motion switch 114, as has been explained, will be in its broken line closed position. This position grounds the common junction 72, and because the common junction 86 is connected to ground through the turn signal switch 26 both the left and right relays 76 and 90 have substantially no difference in potential thereacross the deenergize so that their armatures 82 and 96 are each in the solid line position and the red tail lamps 14R and 16R are illuminated. This advises anyone behind the vehicle that it is stationary.

If while the vehicle is stationary, the turn signal switch 26 is actuated to indicate, e.g., a left turn, all of the bridging members 34, 50, 52 and 60 will be moved to the right. In this right setting the upper bridging member 34 will interconnect the fixed contacts 30 and 32. Since the fixed contact 30 is connected to another junction 124 in the tail lamp control circuit between the light switch 64 and the branches 68 and 70, and the fixed contact 32 is connected to a junction 126 in the left tail lamp operating parallel branch 68 between the relay coil 80 and the voltage dropping resistor 78, current will flow through the voltage dropping resistor 78 and to the bridging member 60. The bridging member 60 in its right setting will interconnect the fixed contacts 56 and 58. Consequently, current will flow through the rear right turn signal lamp 12R to ground. The resistance of the voltage drop resistor 78 is selected so that battery voltage is dropped to a point below that required to illuminate the turn signal lamp 12R. Consequently, it will not illuminate. Also, at the junction 126 current will not flow in the reverse direction through the left relay coil 80 due to the blocking effect of the diode 74. Therefore, the relay coil 80 will remain deenergized. The other L-shaped bridging member 50, having been moved rightwardly, interconnects the fixed contacts 36, 54 and 38 connected respectively to the front turn signal lamp 10F, the rear turn signal lamp 10R and the battery 18 through the flasher 24. Consequently, the turn signal lamp energizing circuit 20 is completed and the front and rear turn signal lamps 10F and 10R are flashed.

If, with the vehicle still stationary and a left turn being indicated, the brakes are applied, the brake switch 120 will be moved to its illustrated broken line closed position and connect the junction 122 to the battery 18. As a consequence, the nonflashing rear right turn signal lamp 12R will have battery potential applied across it by way of the fixed contacts 56 and 58 and the bridging member 60. The turn signal lamp 12R will be illuminated so that one observing the vehicle will note that a left turn is being indicated with the vehicle stationary and the brakes applied. Again, battery potential at the junction 122 and, correspondingly, at the junction 86 will not alter the status of the left and right relays 76 and 90 due to the blocking effect of the diodes 74 and 88.

If for some reason, while the brakes are applied and the vehicle is still stationary, the turn signal switch 26 is returned to its neutral position, then both of the rear turn signal lamps 10R and 12R will be illuminated.

As will be appreciated, the same sequence of events will occur if a right turn is indicated, except that the right turn signal lamps 12F and 12R will be flashed and the left rear turn signal lamp 10R illuminated.

When the vehicle is moving, the motion switch 114 will be moved to its solid line open position so that battery potential is again applied to the common junction 72. Assuming that the turn signal switch 26 is in the neutral position and that the brakes are off, current will flow through the left and right branches 68 and 70 and through the turn signal switch 26 to ground via the rear turn signal lamps 10R and 12R. Both the left and right relays 80 and 94 will be energized and their armatures 82 and 96 moved to the broken line position to illuminate the green tail lamps 14G and 16G. This advises the following vehicle that the vehicle is in motion. It should be noted that the voltage applied to the rear turn signal lamps 10R and 12R is inadequate to illuminate them.

If while moving the brakes are applied, the brake switch 120 will move to its broken line closed position in which battery potential is applied to the junction 122, then through the neutral positioned turn signal switch 26 to the left and right rear turn signal lamps 10R and 12R. Hence, these turn signal lamps 10R and 12R will be illuminated. Also, since at this time battery potential is applied to both of the junctions 86 and 72, the branches 68 and 70 will have the same potential on each side so that the left and right relays 76 and 90 will deenergize and the red tail lamps 14R and 16R will illuminate. The followign motorist knows that the moving vehicle is slowing with the brakes applied.

If, while moving without the brakes applied, the turn signal switch 26 is positioned so as to indicate, e.g., a right turn, the bridging members 52 and 60 will all be moved to the left. The upper bridging member 34 will interconnect the fixed contacts 28 and 30 so that battery potential is applied to the junction 128 on the relay side of the voltage dropping resistor 92. With the junction 128 and the common junction 72 both at battery potential, the relay 90 will deenergize and the red tail lamp 16R on the right turn side of the vehicle will illuminate. From this junction 128 a current path is completed through the voltage dropping resistor 92 and the turn signal switch fixed contacts 54, 56 and the bridging member 60 to ground through the left rear and nonflashing turn signal lamp 10R. Again, the voltage dropping resistor 92, as the voltage dropping resistor 78, reduces the voltage applied to the turn signal lamp 10R below that required to produce illumination. The leftwardly-moved L-shaped bridging member 52 will interconnect fixed contacts 38, 40 and 58 extending respectively to the battery 18 through the flasher 24 and the right front and rear turn signal lamps 12F and 12R. These turn signal lamps 12F and 12R are, therefore, flashed to advise a following driver that the vehicle is moving forwardly without the brakes applied and with an intention to turn right.

If the brakes are applied while the vehicle is moving and a right turn is being indicated, the brake switch 120 will move to the broken line closed position and, as previously explained, battery potential will be applied to the nonflashing rear turn signal lamp 10R to steadily illuminate it. Also, both sides of the parallel branches 68 and 70 will be at battery potential and their respective relays 76 and 90 will be deenergized so that the red tail lamps 14R and 16R are illuminated. This informs the following vehicle that the brakes have been applied and that the vehicle is slowing prior to making the indicated right turn.

Reviewing the FIG. 1 system, when the vehicle is in motion the green tail lamps 14G and 16G are illuminated. When the vehicle is stopped, the red tail lamps 14R and 16R are illuminated. When a turn is indicated, the red tail lamp 14R or 16R on the flashing side of the vehicle is illuminated and the green tail lamp 14G or 16G on the nonflashing side remains illuminated. When the brakes are applied, the red tail lamps 14R and 16R and the nonflashing rear turn signal lamp 10R or 12R are illuminated.

The FIG. 2 vehicle signaling system is substantially the same as the FIG. 1 system except that only one relay is employed. Thus, all like components have been assigned the same numbers and those with similar functions prime numbers. The omission of one relay is accomplished by having the red tail lamps 14R and 16R and the green tail lamps 14G and 16G respectively connected in parallel so as to both be energized by the single armature 96' of the relay 90'. Also, for reasons that will become apparent, the turn signal switch 26' has the fixed contact 30' grounded instead of connected to the battery 18, as does the fixed contact 30 in the FIG. 1 system.

Operationally, the FIG. 2 system is quite similar to the FIG. 1 system except that the green tail lamp on the flashing or turn side is not switched to red. Considering again that the vehicle is stationary, the motion switch 114 will be in its broken line closed position grounding the junction 72' on the one side of the relay coil 94'. On the opposite side of the relay coil 94' the junction 86' is connected through the turn signal switch 26' to ground through the rear turn signal lamps 10R and 12R, assuming the switch 26' is in its neutral position and, accordingly, the bridging member 60. Consequently, the relay 90' will be deenergized and the relay armature 96' positioned in its solid line position so as to illuminate the red tail lamps 14R and 16R. The current limiting resistor 66' again, as its counterpart resistor 66 in the FIG. 1 system, avoids the short circuiting of the license lamp 116 and the tail lamp control circuit 62 through the motion switch 114 to ground by limiting the current that can flow through the motion switch 114.

If with the vehicle stationary the turn signal switch 26' is positioned in either its left turn position or its right turn position, e.g., its left turn position, then in the same way as the turn signal switch 26 in the FIG. 1 system the left turn signal lamps 10F and 10R will be illuminated, while the nonflashing rear turn signal lamp 12R performs as the ground connection for the junction 86'.

If with the vehicle still stationary and a left turn being indicated the brakes are applied, the brake switch 120 will move to its broken line closed position so as to apply battery potential to the junction 86'. Again, the diode 74' prevents current flow in the reverse direction so that the relay 90' remains deenergized. However, this potential at the junction 86' is adaquate to illuminate the nonflashing rear turn signal lamp 12R. Of course, if the turn signal switch 26' is returned to its neutral position and the brake switch 120 continues to be closed, both of the rear current signal lamps 10R and 12R will be illuminated.

When the vehicle incorporating the FIG. 2 system starts moving, the motion switch 114 opens and assumes the solid line position. Battery potential is, as a result, applied to the junction 72' and the relay 90' is energized so that the green tail lamps 14G and 16G are illuminated. As in the FIG. 1 system, the two rear turn signal lamps 10R and 12R continue to serve as grounds, but the potential is not adaquate to illuminate them.

With the vehicle continuing in motion and the turn signal switch 26' maneuvered to indicate a left turn, the left turn signal lamps 10F and 10R are flashed. Within the turn signal switch 26', the bridging member 34 connects the grounded fixed contact 30' and the fixed contact 32 so that the junction 72' is now at ground potential and the relay 90' will deenergize. This illuminates during the turn both of the red tail lamps 14R and 16R.

When the brakes are applied during the moving left turn indication, the brake switch 120 closes and the nonflashing rear turn signal lamp 12R will be illuminated. Of course, if the turn switch 26' is in its neutral position, both of the rear turn signal lamps 10R and 12F will be illuminated.

Therefore, as mentioned, the FIG. 1 and FIG. 2 systems operate in substantially the same way except that during a turn the red tail lamps 14R and 16R on both sides of the vehicle are illuminated, as distinguished from the FIG. 1 system in which only the red tail lamp on the flashing or turning side is illuminated.

In the FIG. 3 modified vehicle signaling system, again those components similar to those in the FIG. 1 system have the same numerals and those with a similar function have the same numbers as their counterparts in the FIG. 1 system except that they have been assigned a double prime. In this FIG. 3 system, again only a single relay 90" is employed and also the upper row of contacts 28, 30 and 32 are not used and the tail light color is not affected by the operation of the turn signal switch 26" or the brake switch 120.

Operationally, when the vehicle is stationary the motion switch 114 is in its solid line closed position and grounds one end of the relay coil 94". The other end of the relay coil 94" is connected through the light switch 64" to the battery 18. The energized relay 90" connects the red tail lamps 14R and 16R to the battery 18 with no interconnection of the turn signal switch 26". Hence, regardless of the position of the turn signal switch 26", the red tail lamps 14R and 16R will remain illuminated when the vehicle is stationary.

A turn is indicated when the vehicle is stationary by actuating the turn signal switch 26" in the same way as described with respect to the FIGS. 1 and 2 systems. For example, if a left turn is to be indicated, the bridging members 50, 52 and 60 are all moved rightwardly to connect the left turn signal lamps 10F and 10R to the battery 18 by way of the bridging member 50 and fixed contacts 36, 38 and 54 through the flasher 24 and the ignition switch 22. Also, the application of the brakes and the resultant moving of the brake switch 120 to its broken line closed position does not affect the tail lamp energizing circuit 62". It does apply battery potential to the turn signal switch fixed contact 56 so that the nonflashing rear trail lamps, either or both 10R and 12R, are illuminated; i.e., if the turn signal switch 26" is in the neutral setting both of the rear turn signal lamps 10R and 12R will be illuminated. If a turn is indicated, only the nonflashing one of the these turn signal lamps 10R or 12R will be illuminated.

With the FIG. 3 signaling system, motion of the vehicle causes the motion switch 114 to open and assume its broken line position. This disconnects the relay coil 94" from ground and, consequently, the relay 90" will deenergize so that its armature 96" will move to the broken line position and connect the green tail lamps 14G and 16G to the battery 18 through the lamp switch 64". As when the vehicle is stationary, actuation of the turn signal switch 26" or the brake switch 120 will not alter this illuminated state of the green tail lamps 14G and 16G and the nonflashing rear turn signal lamps 10R or 12R, or both, will be illuminated.

As will be appreciated from the foregoing description, the invention enables the turn signaling circuit and the tail lamp indicating circuit to be related so as to beneficially provide visual signaling of turning, stopping, moving and braking vehicle actions. Therefore, a following driver can with this visual signaling make the appropriate adjustments in the operation of his vehicle. Not only do the turn signal lamps afford turn information but they also furnish stop information and can contribute to the circuit for controlling the tail lamps.

What is claimed is:

1. A signaling system for a vehicle comprising front and rear turn signal lamps on each side of the vehicle; a pair of signaling lamps on each side of the vehicle, one of the signaling lamps being of one color and the other of another color; a source of current at a certain potential; a turn signal lamp energizing circuit for indicating the direction of turn; the turn signal lamp energizing circuit including in series with the signal lamps and the source a flasher and a turn signal switch manually maneuverable from a neutral position to one of two turn signal lamp energizing positions for connecting to the source and thereby illuminating the front and rear signal lamps on the side of the vhicle corresponding to the direction of turn; and a signaling lamp control circuit for connecting either the one color signaling lamps or the other color signaling lamps to the current source; the signaling lamp control circuit including in series with and between the turn signal switch and the current source a relay operative to connect to the source and thereby illuminate when respectively energized and deenergized the other color signaling lamps and the one color signaling lamps and a one-way conducting device providing for forward current flow through the relay to the turn signal switch; the turn signal switch being operative to provide a low potential return current path to the source for the signaling lamp control circuit in the neutral position thereof by way of both rear turn signal lamps and in each of the turn signal lamp energizing positions to so connect both sides of the relay to the source that the resultant difference in potential thereacross causes the relay to deenergize and illuminate the one color signaling lamps; a switch responsive to vehicle movement, the switch being operative when the vehicle is stationary to provide a shunt path for current around the relay and back to the source so that the relay is deenergized and the one color signaling lamps are illuminated and when the vehicle is in motion to permit current flow through the relay so that the other color signaling lamps can be illuminated; and a brake switch operative when the vehicle brakes are actuated to complete a parallel path for current from the source to between the relay and the turn signal switch so that the resultant difference in potential across the relay causes the relay to deenergize and illuminate the one color signaling lamps.

2. A signaling system for a vehicle comprising front and rear turn signal lamps on each side of the vehicle; a pair of signaling lamps on each side of the vehicle; one of the pair of signaling lamps being of one color and the other of another color; a source of current at a certain potential; a turn signal lamp energizing circuit for indicating the direction of turn; the turn signal lamp energizing circuit including in series with the turn signal lamps and the source a flasher and a turn signal switch manually maneuverable from a neutral position to one of two turn signal lamp energizing positions for connecting to the source and thereby flashing the front and rear turn signal lamps on the side of the vehicle corresponding to the direction of turn; a signaling lamp control circuit for connecting either the one color signaling lamps or the other color signaling lamps to the source; the signaling lamp control circuit including parallel branches connected in series with and between the turn signal switch and the source, each parallel branch having in series a relay operative to connect to the source and thereby illuminate the other color signaling lamp in one state thereof and the one color signaling lamp in the other state thereof on one side of the vehicle and a one-way conducting device providing for forward current flow through the relay to the turn signal switch; the turn signal switch being operative to provide a return current path for the parallel branches to the source in the neutral position thereof by way of both rear turn signal lamps and in each of the signal lamp energizing positions by way of the nonflashing turn signal lamp; the turn signal switch also being operative in each of the signal lamp energizing positions to so connect the source to the relay in the parallel branch for the signaling lamps on the side of the vehicle corresponding to the direction of turn that the resultant difference in potential across the relay causes the relay to assume the other state thereof and illuminate the one color signaling lamp on the direction of turn side of the vehicle; a motion switch responsive to vehicle movement, the motion switch being operative when the vehicle is stationary to provide a shunt path for current around the parallel branches and back to the source so that both relays assume the other state thereof and the one color signaling lamps are illuminated and when the vehicle is in motion to permit current flow through the parallel branches so that the other color signaling lamps can be illuminated; and a brake switch operative when the vehicle brakes are actuated to complete a parallel path for current from the source to between the parallel branches and the turn signal switch so that the resultant difference in potential across the parallel branches causes the relays to assume the other state thereof and illuminate the one color signaling lamps.

3. A signaling system for a vehicle comprising front and rear signal lamps on each side of the vehicle; a rear red tail lamp and a green tail lamp both on each side of the vehicle; a source of current at a certain potential; a signal lamp energizing circuit for indicating the direction of turn; the signal lamp energizing circuit including in series with the signal lamps and the source a flasher and a turn signal switch manually maneuverable from a neutral position to one of two signal lamp energizing positions for connecting to the source and thereby flashing the front and rear signal lamps on the side of the vehicle corresponding to the direction of turn; a tail lamp control circuit for connecting either the rear red tail lamps or the rear green tail lamps to the source; the tail lamp control circuit including parallel branches connected in series with and between the turn signal switch and the source, each parallel branch having in series a relay operative when respectively energized and deenergized to connect to the source and thereby illuminate the green tail lamp and the red tail lamp on one side of the vehicle, a one-way conducting device providing for forward current flow through the relay to the turn signal switch, and a resistor; the turn signal switch being operative to provide a return current path for the parallel branches to the source in the neutral position thereof by way of both rear signal lamps and in each of the signal lamp energizing positions by way of the nonflashing signal lamp; the turn signal switch also being operative in each of the signal lamp energizing positions to connect the source to between the resistor and the relay in the parallel branch for the tail lamps on the side of the vehicle corresponding to the direction of turn so that the resultant difference in potential thereacross causes the relay to deenergize and illuminate the red tail lamp on the direction of turn side of the vehicle and so that the potential applied to the nonflashing lamp is inadequate to illuminate the nonflashing lamp due to the reduction in potential produced by the resistor; a motion switch responsive to vehicle movement, the motion switch being operative when the vehicle is stationary to provide a shunt path for current around the parallel branches and back to the source so that both relays are deenergized and the red tail lamps are illuminated and when the vehicle is in motion to permit current flow through the parallel branches so that the green tail lamps can be illuminated; and a brake switch operative when the vehicle brakes are actuated to complete a parallel path for current from the source to between the parallel branches and the turn signal switch so that the resultant difference in potential across the parallel branches causes the relays to deenergize and illuminate the red tail lamps.

4. A signaling system for a verhicle comprising front and rear turn signal lamps on each side of the vehicle; a pair of signaling lamps on each side of the vehicle; one of the pair of signaling lamps being of one color and the other of another color; a source of current at a certain potential; a turn signal lamp energizing circuit for indicating the direction of turn; the turn signal lamp energizing circuit including in series with the turn signal lamps and the source a flasher and a turn signal switch maunally maneuverable from a neutral position to one of two turn signal lamp energizing positions for connecting to the source and thereby flashing the front and rear turn signal lamps on the side of the vehicle corresponding to the direction of turn; and a signaling lamp control circuit for connecting either the one color signaling lamps or the other color signaling lamps to the source; the signaling lamp control circuit including connected in series with and between the turn signal switch and the source a relay operative to connect to the source and thereby illuminate the other color signaling lamps in one state thereof and in another state thereof the one color signaling lamps, and a one-way conducting device providing for forward current flow through the relay to the turn signal switch; the turn signal switch being operative to provide a low potential return current path to the source for the signaling lamp control circuit in the neutral position thereof by way of both rear turn signal lamps and in each of the signal lamp energizing positions to so connect both sides of the relay to the source that the resultant difference in potential thereacross causes the relay to assume the other state thereof and illuminate the one color signaling lamps; a motion switch responsive to vehicle movement; the motion switch being operative when the vehicle is stationary to provide a shunt path for current around the relay and back to the source so that the relay assumes the other state thereof and the one color signaling lamps are illuminated and when the vehicle is in motion to permit current flow through the relay so that the other color signaling lamps can be illuminated; and a brake switch operative when the vehicle brakes are actuated to complete a parallel path for current from the source to between the relay and the turn signal switch so that the resultant difference in potential across the relay causes the relay to assume the other state thereof and illuminate the one color signaling lamps and also by way of the turn signal switch and back to the source so that certain ones of the lamps are illuminated in each of the positions of the turn signal switch.

5. A signaling system for a vehicle comprising front and rear signal lamps on each side of the vehicle; a rear red tail lamp and a rear green tail lamp both on each side of the vehicle; a source of current at a certain potential; a signal lamp energizing circuit for indicating the direction of turn; the signal lamp energizing circuit including in series with the signal lamps and the source a flasher and a turn signal switch manually maneuverable from a neutral position to one of two signal lamp energizing positions for connecting to the source and thereby flashing the front and rear signal lamps on the side of the vehicle corresponding to the direction of turn; and a tail lamp control circuit for connecting either the rear red tail lamps or the rear green tail lamps to the source; the tail lamp control circuit including connected in series with and between the turn signal switch and the source a relay operative to connect to the source and thereby illuminate when respectively energized and deenergized the green tail lamps and the red tail lamps, and a one-way conducting device providing for forward current flow through the relay to the turn signal switch; the turn signal switch being operative to provide a low potential return current path to the source for the tail lamp control circuit in the neutral position thereof by way of both rear signal lamps and in each of the signal lamp energizing positions to so connect both sides of the relay to the source that the resultant difference in potential thereacross causes the relay to deenergize and illuminate the red tail lamps; a motion switch responsive to vehicle movement; the motion switch being operative when the vehicle is stationary to provide a shunt path for current around the relay and back to the source so that the relay is deenergized and the red tail lamps are illuminated and when the vehicle is in motion to permit current flow through the relay so that the green tail lamps can be illuminated; and a brake switch operative when the vehicle brakes are actuated to complete a parallel path for current from the source to between the relay and the turn signal switch so that the resultant difference in potential across the relay causes the relay to deenergize and illuminate the red tail lamps and also by way of the turn signal switch and back to the source through both rear signal lamps when the turn signal switch is in the neutral position so as to illuminate both rear signal lamps and through the nonflashing rear signal lamp when the turn signal switch is in one of the signal lamp energizing positions so as to illuminate the nonflashing rear signal lamp.

6. A signaling system for a vehicle comprising front and rear turn signal lamps on each side of the vehicle; a pair of signaling lamps on each side of the vehicle, one of the signaling lamps being of one color and the other of another color; a source of current at a certain potential; a turn signal lamp energizing circuit for indicating the direction of turn; the turn signal lamp energizing circuit including in series with the signal lamps and the source a flasher and a turn signal switch manually maneuverable from a neutral position to one of two turn signal lamp energizing positions for connecting to the source and thereby illuminating the front and rear signal lamps on the side of the vehicle corresponding to the direction of turn; and a signaling lamp control circuit for connecting either the one color signaling lamps or the other color signaling lamps to the current source; the signaling lamp control circuit including in series with and between the turn signal switch and the current source a relay operative to connect to the source and thereby illuminate when respectively energized and deenergized the other color signaling lamps and the one color signaling lamps and a one way conducting device providing for forward current flow through the relay to the turn signal switch; the turn signal switch being operative to provide a low potential return current path to the source for the signaling lamp control circuit in the neutral position thereof by way of both rear turn signal lamps and in each of the turn signal lamp energized positions to so connect both sides of the relay to the source that the resultant difference in potential thereacross causes the relay to deenergize and illuminate the one color signaling lamps; a motion switch responsive to vehicle movement, the motion switch being operative to allow or prevent current flow to actuate the relay so that the one color signaling lamps are illuminated when the vehicle is stationary and the other color signaling lamps are illuminated when the vehicle is moving; and a brake switch operative when the vehicle brakes are actuated to complete a parallel path for current from the source to between the relay and the turn signal switch so that the resultant difference in potential across the relay causes the relay to deenergize and iluminate the one color signaling lamps.

7. A signaling system for a vehicle comprising front and rear turn signal lamps on each side of the vehicle; a pair of signaling lamps on each side of the vehicle; one of the pair of signaling lamps being of one color and the other of another color; a source of current at a certain potential; a turn signal lamp energizing circuit for indicating the direction of turn; the turn signal lamp energizing circuit including in series with the turn signal lamps and the source a flasher and a turn signal switch manually maneuverable from a neutral position to one of two turn signal lamp energizing positions for connecting to the source and thereby flashing the front and rear turn signal lamps on the side of the vehicle corresponding to the direction of turn; a signaling lamp control circuit for connecting either the one color signaling lamps or the other color signaling lamps to the source; the signaling lamp control circuit including parallel branches connected in series with and between the turn signal switch and the source, each parallel branch having in series a relay operative to connect to the source and thereby illuminate the other color signaling lamp in one state thereof and the one color signaling lamp in the other state thereof on one side of the vehicle and a one way conducting device providing for forward current flow through the relay to the turn signal switch; the turn signal switch being operative to provide a return current path for the parallel branches to the source in the neutral position thereof by way of both rear turn signal lamps and in each of the signal lamp energizing positions by way of the nonflashing turn signal lamp; the turn signal switch also being operative in each of the signal lamp energizing positions to so connect the source to the relay in the parallel branch for the signaling lamps on the side of the vehicle corresponding to the direction of turn that the resultant difference in potential across the relay causes the relay to assume the other state thereof and illuminate the one color signaling lamp on the direction of turn side of the vehicle; a motion switch responsive to vehicle movement, the motion switch being operative to allow or prevent current flow to actuate both relays so that the one color signaling lamps are illuminated when the vehicle is stationary and the other color signaling lamps are illuminated when the vehicle is moving; and a brake switch operative when the vehicle brakes are actuated to complete a parallel path for current from the source to between the parallel branches and the turn signal switch so that the resultant difference in potential across the parallel branches causes the relays to assume the other state thereof and illuminate the one color signaling lamps.

References Cited
UNITED STATES PATENTS

| | | | | |
|---|---|---|---|---|
| 2,810,899 | 10/1957 | Foster | 340—67 | X |
| 3,215,979 | 11/1965 | Ryan | 340—72 | X |
| 3,244,934 | 4/1966 | Webb | 340—81 | X |
| 3,281,786 | 10/1966 | Leichsenring | 340—72 | X |
| 3,320,586 | 5/1967 | Wagner | 340—66 | |
| 3,444,514 | 5/1969 | Yang | 340—66 | |

ALVIN H. WARING, Primary Examiner

K. N. LEIMER, Assistant Examiner

U.S. Cl X.R.

340—62, 81